United States Patent
Wichert et al.

(10) Patent No.: US 10,742,028 B2
(45) Date of Patent: Aug. 11, 2020

(54) LONGITUDINAL VOLTAGE REGULATION AT THE LINE TERMINALS OF A PHASE SHIFTING TRANSFORMER

(71) Applicant: ABB Power Grids Switzerland AG, Baden (CH)

(72) Inventors: Marko Wichert, Troisdorf (DE); Kevin Juchem, Bonn (DE); Oliver Derigs, Bad Breisig (DE)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/656,581

(22) Filed: Oct. 18, 2019

(65) Prior Publication Data
US 2020/0052486 A1 Feb. 13, 2020

Related U.S. Application Data

(63) Continuation of application No. PCT/EP2018/059505, filed on Apr. 13, 2018.

(30) Foreign Application Priority Data

Apr. 21, 2017 (EP) .................... 17167649

(51) Int. Cl.
*H02J 3/06* (2006.01)
*G05F 1/30* (2006.01)
(Continued)

(52) U.S. Cl.
CPC ............... *H02J 3/06* (2013.01); *H01F 27/38* (2013.01); *H01F 29/04* (2013.01); *H02J 3/38* (2013.01);
(Continued)

(58) Field of Classification Search
CPC ........ H02J 3/06; H02J 3/46; H02J 3/18; H02J 3/1878; H02J 3/38; H03H 7/20;
(Continued)

(56) References Cited

U.S. PATENT DOCUMENTS

| 3,690,739 | A | * | 9/1972 | Prescott | ................. H01F 29/02 323/342 |
| 4,661,763 | A | | 4/1987 | Ari et al. | |
| 5,371,485 | A | * | 12/1994 | Manimalethu | .......... H01F 29/02 336/170 |
| 5,434,455 | A | | 7/1995 | Kammeter | |

(Continued)

FOREIGN PATENT DOCUMENTS

| EP | 0698309 B1 | 4/1997 |
| WO | WO 2007035111 A1 | 3/2007 |
| WO | WO 2016131887 A1 | 8/2016 |

*Primary Examiner* — Gary L Laxton
*Assistant Examiner* — Ivan Laboy
(74) *Attorney, Agent, or Firm* — Sage Patent Group

(57) ABSTRACT

A phase shifting transformer for poly-phase alternating current includes source side terminals, load side terminals, an exciting unit, and a series unit. The exciting unit includes further coils that are magnetically coupled to primary coils and to the secondary coils of the exciting unit to provide further voltages. The further coils are connected in series between the source side terminals and the series unit, so that the voltages at the load terminals are combinations of the quadrature voltages and the further voltages with the source voltages, thus modifying the voltage phase displacement between the source side terminals and the load side terminals.

10 Claims, 7 Drawing Sheets

(51) Int. Cl.
  *H01F 27/38* (2006.01)
  *H01F 29/04* (2006.01)
  *H02J 3/38* (2006.01)
  *H02J 3/18* (2006.01)
  *H01F 30/12* (2006.01)
  *H02P 13/06* (2006.01)

(52) U.S. Cl.
  CPC .............. *H01F 30/12* (2013.01); *H02J 3/1878* (2013.01); *H02P 13/06* (2013.01)

(58) Field of Classification Search
  CPC ........ H01F 27/38; H01F 29/02; H01F 29/025; H01F 29/04; H01F 30/12; G05F 1/14; G05F 1/30; G05F 1/24; H02P 13/06
  USPC ................ 323/215, 217, 255–258, 341, 340, 323/342–343; 363/5
  See application file for complete search history.

(56) References Cited

U.S. PATENT DOCUMENTS

| | | | | |
|---|---|---|---|---|
| 5,619,119 | A * | 4/1997 | Pelletier | H02J 3/38 323/215 |
| 6,335,613 | B1 * | 1/2002 | Sen | G05F 1/12 323/211 |
| 6,384,581 | B1 * | 5/2002 | Sen | H02J 3/06 323/211 |
| 6,396,248 | B1 * | 5/2002 | Sen | G05F 1/70 323/209 |
| 6,420,856 | B1 * | 7/2002 | Sen | H02J 3/1878 323/209 |
| 6,737,837 | B1 * | 5/2004 | Halvarsson | G05F 1/70 323/205 |
| 2006/0138870 | A1 * | 6/2006 | Brochu | H02G 7/16 307/147 |
| 2009/0218993 | A1 * | 9/2009 | Berggren | H02J 3/1828 323/205 |

* cited by examiner

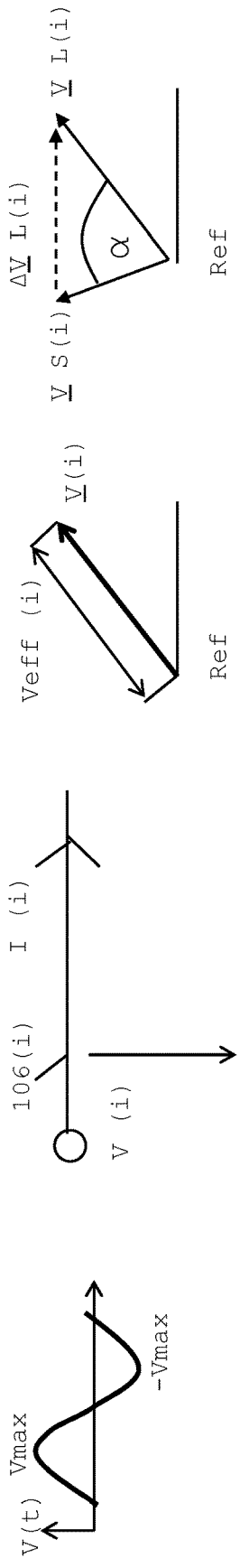
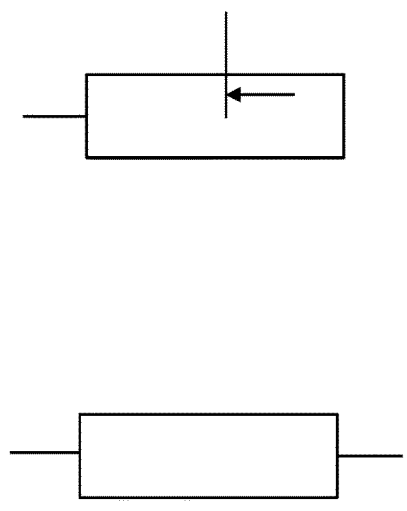
FIG. 1A FIG. 1B FIG. 1C FIG. 1D
FIG. 2A FIG. 2B FIG. 2C FIG. 2D

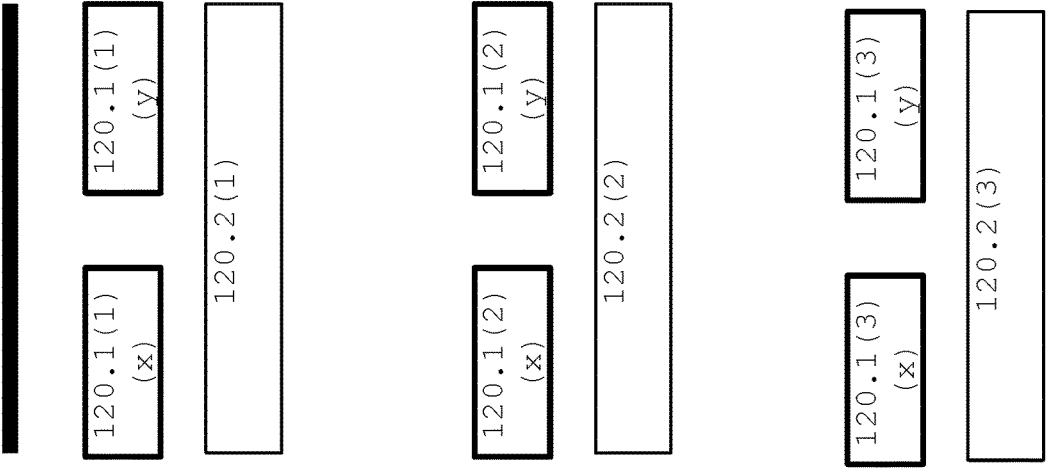
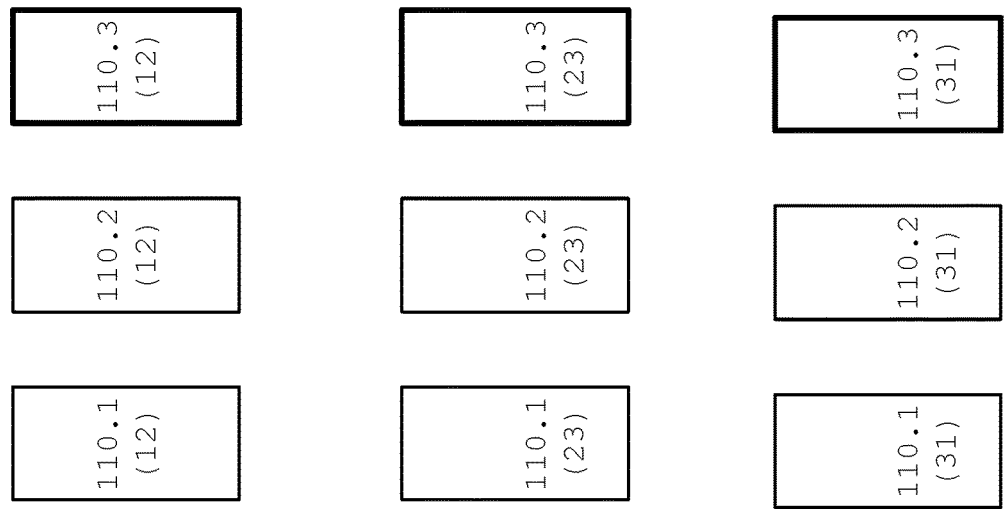
FIG. 8

LONGITUDINAL VOLTAGE REGULATION AT THE LINE TERMINALS OF A PHASE SHIFTING TRANSFORMER

CROSS-REFERENCE

The present application is a continuation of International Patent Application No. PCT/EP2018/059505, which was filed on Apr. 13, 2018 and published as International Publication No. WO 2018/192845. The International Patent Application and Publication are hereby incorporated by reference. The International Patent Application claims priority to European Patent Application No. 17167649.7, which was filed on Apr. 21, 2017 and hereby incorporated by reference.

FIELD

The present invention relates to the transmission of electrical energy via transmission lines, and more in particular relates to phase shifting transformers that regulate the flow of electrical energy.

BACKGROUND

Electrical energy is often generated, transmitted and distributed by alternating-current (AC) in poly-phase arrangements, such as three-phase arrangements with phase-lines L1, L2 and L3. In energy networks, power lines transmit electrical energy between nodes, such as power stations or sub-stations.

There are many types of power lines. Some of them transmit energy at voltages of 220 kV (kilo volt, or more) and with an electrical power in the magnitude of several 100 MVA (mega volt ampere, apparent power).

AC periodically changes between positive and negative peaks, but the peaks for voltage and current are not in synch. For a fraction of a period, the current is lagging behind. This difference in time is usually represented by the so-called phase angle displacement $\phi$ (or phase shift $\phi$.

SUMMARY

In an embodiment, the present invention provides A phase shifting transformer for poly-phase alternating current includes source side terminals, load side terminals, an exciting unit, and a series unit. The exciting unit includes a first transformer with primary coils connected between pairs of the source side terminals and with secondary coils to provide quadrature voltages. The series unit includes a second transformer with primary coils connected in series between the source side terminals and the load side terminals and with secondary coils to receive the quadrature voltages, thus providing a voltage phase displacement between the source side terminals and the load side terminals. The exciting unit includes further coils that are magnetically coupled to the primary coils and to the secondary coils of the exciting unit to provide further voltages. The further coils are connected in series between the source side terminals and the series unit, so that the voltages at the load terminals are combinations of the quadrature voltages and the further voltages with the source voltages, thus modifying the voltage phase displacement between the source side terminals and the load side terminals.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 1A, 1B, 1C and 1D illustrate symbols and writing conventions that are used to explain the phase shifting transformer;

FIGS. 2A, 2B, 2C and 2D illustrate drawing symbols to explain the structure of the phase shifting transformer;

FIG. 8 illustrates the exemplary phase shifting transformer with an alternative arrangement of the coils and the cores.

DETAILED DESCRIPTION

Figure 3:
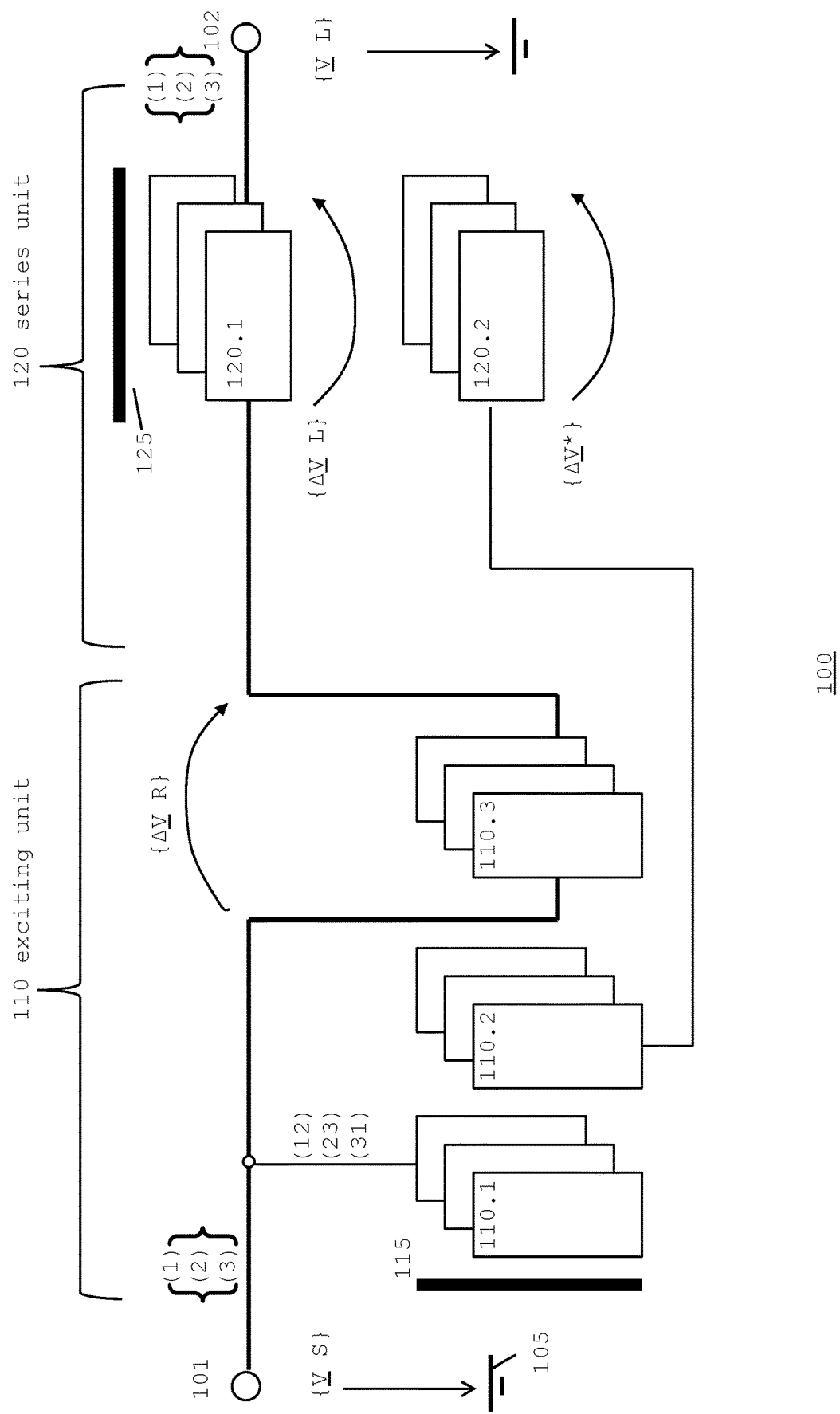
FIG. 3 illustrates an exemplary phase shifting transformer with source-to-load coils that are magnetically coupled to an exciting unit.

As previously discussed, AC periodically changes between positive and negative peaks, but the peaks for voltage and current are not in synch. For a fraction of a period, the current is lagging behind. This difference in time is usually represented by the so-called phase angle displacement $\phi$ (or phase shift $\phi$).

There are several consequences. This displacement $\phi$ influences the so-called active power that is actually being transmitted between the nodes. Is it well-known that the active power can be calculated as the product of voltage, current and cos $\phi$. The displacement $\phi$ also influences the so-called reactive power. In the network, both power aspects need to be considered, otherwise the transmission become less efficient, or even the network fails. The network transmits electrical energy from a first sub-station (that is associated with the generator or with the producer) to a second sub-station (that is associated with a load or with a consumer). There can be two (or more) power lines between the sub-stations. In case that the power lines have different transmission capacities, the amounts of energy in each power line have to be adapted to these capacities. One of the power lines transmits more energy; the other power line transmits less energy. Overloading the power lines need to be avoided. In this respect, the displacement $\alpha$ in time between the voltages plays an important role.

Network nodes, such as power-stations and sub-stations can be equipped with phase shifting transformers (PSTs), also called "call quadrature boosters". According to IEC/IEEE FDIS 60076-57-1202 (draft), the term "series unit" refers to core and windings of a two-core PST containing the series winding, and the term "exciting unit" refers to core and windings of a two-core PST that provides excitation to the series unit. Much simplified, PSTs transform electrical energy by changing the displacement α. As a consequence, the flow of active power can be regulated and adapted to the capacities of the power lines. However, there are technical constraints: α also depends on the inductance of the transformer coils that relates to the magnetic flux density in the cores of the coils. The physical dimensions of the coils and the material limit the ability for changing α.

Embodiments of the present invention provide a phase shifting transformer for poly-phase alternating current (AC) with source side terminals and with load side terminals. An exciting unit is a first transformer with primary coils that are connected between pairs of the source side terminals and with secondary coils to provide quadrature voltages. A series unit is a second transformer with primary coils connected in series between the source side terminals and the load side terminals and with secondary coils to receive the quadrature voltages. The quadrature voltages are combined to the voltages at the source side terminals so that—in relation to the voltages at the load side terminals—a voltage phase displacement is provided.

In an embodiment, the exciting unit has further coils that are magnetically coupled to the primary coils and to the secondary coils of the exciting unit to provide further voltages. The further coils are connected in series between the input terminals and the series unit so that the voltages at the load terminals are combinations of the quadrature voltages and the further voltages with the source voltages. This modifies the voltage phase displacement between the source side terminals and the load side terminals.

According to an embodiment, in the exciting unit, the further coils can be magnetically coupled to the primary coils and to the secondary coils by being mounted on a common core that is common to the primary, the secondary and the further coils. The further coils can have adjustable inductance so that the amplitude of the further voltages is adjustable. The inductance of the further coils is adjustable by a regulator tap that modifies the number of windings that are used to provide the further voltages. A polarity switch can be adapted to alter the polarity of the further coils so that the polarity of the further voltages can be altered.

According to an embodiment, since the quadrature voltages and the further voltages can be different in terms of amplitude, phase displacement or polarity, the transmission of electrical energy can be regulated not only in terms of active power, but also in terms of reactive power.

In other words, and according to an embodiment, the voltages that provide phase displacement between source and load are not only quadrature voltages but combinations of quadrature voltages and longitudinal voltages. Since both the quadrature and the longitudinal voltages can be regulated separately, both the active power and the reactive power can be regulated.

FIGS. 1A, 1B, 1C and 1D illustrate symbols and writing conventions that the description uses to explain the phase shifting transformer. The voltage displacement α (i.e. the "phase shift") that is introduced by the transformer is relevant.

FIG. 1A illustrates that the momentary values V(t) of an (alternate) voltage V can be represented by a sinus curve. In a cycle, the voltage V(t) alternates between V=0, Vmax (the voltage amplitude), 0, −Vmax and again 0. For a voltage alternating at a power line frequency 50 Hz, the cycle has a duration of 20 ms (milli seconds). The same principle applies for the current I(t) (not illustrated). Likewise, the same principle applies for a power line frequency of 60 Hz.

FIG. 1B illustrates that voltages V(i) are measured between line 106(i) and ground 105. The line goes from a terminal, or goes to a terminal. Index (i) identifies the line L1, L2 or L3. Currents I(i) are measured within the line (i). The description herein uses "voltages" in plural, because the momentary values in the three lines are different. The persons of skill in the art can apply the teachings herein to other poly-phase arrangements, such as to arrangements with 5 phase-lines (1), (2), (3), (4), and (5).

FIG. 1C illustrates that an alternating voltage can also graphically be represented by a vector. The vector starts at a coordinate origin ("Ref"). The coordinate system can be a Cartesian system with real coordinates (horizontal) and imaginary coordinates (vertical). The figure does not give more details, because such coordinates are known in the art. Voltage V(i) can be represented by a vector having a length that corresponds to the so-called effective value Veff(i). Underscoring the uppercase letter "V" indicates that the letter symbolizes the vector. Index (i) is optional. Voltages V(1), V(2), and V(3) are measured against ground as well. The same principle applies for current I (not illustrated, with underscoring for the vector). The current vector has a length that corresponds to the so-called effective value Ieff of the current and has an angle to the same reference system.

FIG. 1D illustrates a phasor diagram with two alternating voltages V S(i) and V L(i) that have a phase-difference, symbolized here by displacement angle α. Both voltages are available at different locations within the phase shifting transformer, in the example at the source side (index S) and at the load side (index L). FIG. 1D also illustrates that vectors can be combined by vector addition. In the example, V S(i) in combination with ΔV L(i) leads to V L(i). Advantages of the phase shifting transformer will be explained in connection with such phasor diagrams (in FIGS. 5A and 5B).

It is noted that in each line L(i), the time difference between consecutive zero crossings of voltage V(i) and current I(i) can be represented by the phase angle displacement φ. φ is equal in each of the lines L1, L2 and L3. There is however, a phase displacement of 120 degrees from line to line (i.e., from V(1) to V(2), from V(2) to V(3), from V(3) to V(1). The same principle applies for the currents.

FIGS. 2A, 2B, 2C and 2D illustrate drawing symbols to explain the structure of the phase shifting transformer.

FIGS. 2A and 2B illustrate that rectangles stand for coils. The coils have connectors that are illustrated by straight lines. FIG. 2A illustrates that a coil can have an inductance that is not regulated. FIG. 2B illustrates that a coil can have an inductance that is regulated and therefore variable (cf. the arrow symbol at the regulator tap). Practically, regulating the inductance changes the number of windings between the connectors. Coils with an adjustable number of windings are known in the art. Those of skill in the art can provide actuators that let the number of windings vary. The actuators can be controlled by electronic circuitry, by computers or the like.

FIGS. 2C and 2D illustrate that one or more coils 110, 120 (white rectangles) can have a core 115, 125. In other words, the core is common to the coils. In the figures, the cores are illustrated by black rectangles, that can be placed vertically (as core 115) or horizontally (as core 125).

Coils can be further identified by the line indices, with a single index (i) if the coils are applicable to a single line (i.e. L1, L2 or L3), and with a double-digit index (ij) if the coils (or the core) are applicable to a combination of lines ("12" for the combination between L1 and L2, "23" for the combination between L2 and L3, and "31" for the combination between L3 and L1). Assigning cores to lines is also possible.

As used herein, the common cores 115, 125 stand for any arrangement that provides magnetic flow Φ through the coils. The coils and the common core form a transformer. For convenience of explanation, the coils are labeled "primary coil" (or "0.1"), "secondary coil" ("or 0.2"), and—optionally—"tertiary coil" or ("0.3") or "further coil"). The person of skill in the art can select suitable core forms, and can arrange the coils accordingly (cf. FIG. 8). Coil 0.1 can be winded to the core, coil 0.2 can be winded above coil 0.1 and so on, but this is not required. Transformers are explained in a number of text books (cf. Lunze, Klaus: Einführung in die Elektrotechnik. Lehrbuch für Elektrotechnik als Hauptfach. Berlin 1985, especially in section 3.3.9).

FIG. 3 illustrates phase shifting transformer 100 for 3-phase alternating current (AC). Transformer 100 has an input side that is illustrated on the left side of the figure, and transformer 100 has an output side that is illustrated on the right side of the figure. In operation, the input side is usually connected to source side terminals 101, and the output side is usually connected to load side terminals 102. Voltages are therefore distinguished as source voltages $\{\underline{V}\ S\}$ (or input voltages) and load voltages $\{\underline{V}\ L\}$ (or output voltages). Transformer 100 is connected to ground 105 (or earth), and the voltages are measured against ground. The curly braces { } indicate that there are actually three voltages, for the three lines (1), (2), and (3) (or L1, L2, L3). The same symbol { } appears in the figure on top of single drawings lines. Since transformer 100 has substantially equal construction for the components of lines (1), (2), and (3), the figures is simplified by illustrating blocks above each other.

Transformer 100 has two sub-transformers, or sub-units (or "first and second transformers"): exciting unit 110 (or "exciter", illustrated on the left side), and series unit 120 (illustrated on the right side). Series unit 120 has three primary coils 120.1 and three secondary coils 120.2 with common core 125. Exciting unit 110 has three primary coils 110.1, three secondary coils 110.2 and three tertiary coils 110.3, with common core 115.

Exciting unit 110—being the first transformer—has its primary coils 110.1 connected between pairs (indices (12), (23), (31)) of source side terminals 101, and has its secondary coils 110.2 to provide intermediate voltages $\{\Delta\underline{V}^*\}$ that correspond to the quadrature voltages $\{\Delta\underline{V}\ L\}$.

Series unit 120—being the second transformer—has primary coils 120.1 connected in series between source side terminals 101 and load side terminals 102, and has secondary coils 120.2 to receive the intermediate voltages $\{\Delta\underline{V}^*\}$ that correspond to the quadrature voltages $\{\Delta\underline{V}\ L\}$. There is a voltage translation from secondary coils 120.2 to primary coils 120.1 (with $\{\Delta\underline{V}\ L\}$), for example by up-transforming from lower intermediate voltages to higher quadrature voltages. This approach provides a voltage phase displacement between the source side terminals 101 and the load side terminals 102.

As illustrated by bold lines, there is a source-to-load circuit from source side terminals 101 to load side terminals 102. As illustrated by normal lines, the connection between coils 110.2 and coils 120.2 can be considered as an intermediate circuit that does not have to have a connection to the source-to-load circuit.

Exciting unit 110 has further coils 110.3 that are magnetically coupled to primary coils 110.1 and to secondary coils 110.2 of exciting unit 110 to provide further voltages $\{\Delta\underline{V}\ R\}$. The further voltages are the above-mentioned longitudinal voltages. Further coils 110.3 are connected in series between source side terminals 101 and series unit 120. Voltages $\{\underline{V}\ L\}$ at the load terminals are combinations of the quadrature voltages $\{\Delta\underline{V}\ L\}$ and the further voltages $\{\Delta\underline{V}\ R\}$ with the source voltages $\{\underline{V}\ S\}$. This approach modifies the mentioned voltage phase displacement (cf. FIGS. 5A, 5B) between source side terminals 101 and load side terminals 102.

It is noted that coils 110.3 are source-to-load coils that are magnetically coupled to exciting unit 110 (e.g. via the common coil). In that sense, exciting unit 110 is not only a unit that provides quadrature voltages (as exciting units usually do), but also a unit that acts on the source-to-load circuit.

In exciting unit 110, further coils 110.3 are magnetically coupled to primary coils 110.1 and to secondary coils 110.2 by being mounted on common core 115.

In exciting unit 120, the number of windings of further coils 120.3 can be less than the number of windings in primary coils 110.1 of the exciting unit 110.

Figure 4:
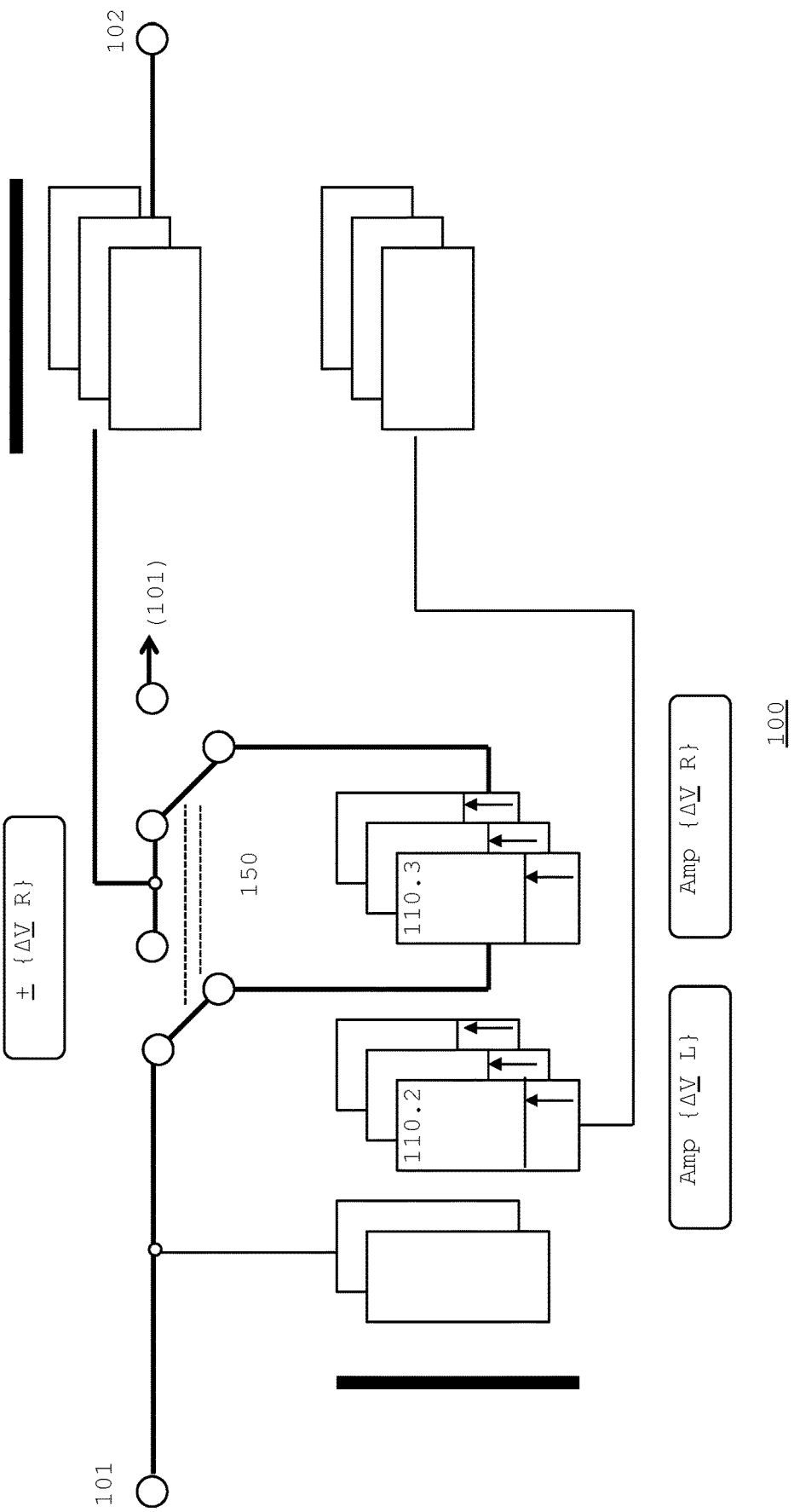
FIG. 4 illustrates the exemplary phase shifting transformer in embodiments with variable coils to modify the amplitude of the quadrature voltages and of the further voltages, and with a polarity switch that changes the coil polarity.

FIG. 4 illustrates phase shifting transformer 100 in embodiments with variable coils 110.2 and 110.3. The coils are variable by having adjustable inductances. The person of skill in the art understands to vary the inductance in the individual coils substantially in the same way. The inductance (of coils 110.2 and 110.3) can be made adjustable by a regulator tap (arrow symbol) that modifies the number of windings that are used to provide the voltages (quadrature voltages $\{\Delta\underline{V}\ L\}$, further voltages $\{\Delta\underline{V}\ R\}$). The variability allows modifying the amplitude "Amp" of the quadrature voltages $\{\Delta\underline{V}\ L\}$ and of the further voltages $\{\Delta\underline{V}\ R\}$.

Polarity switch 150 can be provided that changes the coil polarity of further coils 110.3. This allows altering the polarity (plus/minus symbol) of further voltages $\{\Delta\underline{V}\ R\}$.

Figure 5:
FIGS. 5A and 5B illustrate exemplary phasor diagrams for the operation of the transformer.

FIGS. 5A and 5B illustrate phasor diagrams for the operation of transformer 100. Similar to FIG. 1D, there is an alternating voltage $\underline{V}\ S(i)$ (at any input line (1)(2)(3)). Quadrature voltage $\Delta\underline{V}\ L(i)$ is added. Different from FIG. 1D, further voltage $\Delta\underline{V}\ R(i)$ is added as well. In vector notation, the resulting voltage (at the load side terminals) is a sum, as follows: $\underline{V}\ L(i)=\underline{V}\ S(i)+\Delta\underline{V}\ L(i)+\Delta\underline{V}\ R(i)$. This provides phase-difference a between the voltages at source side terminals 101 (cf. FIG. 3) and the load side terminals 102 (cf. FIG. 3). The notation with { } would be equivalent to the notation with (i).

FIG. 5A and FIG. 5B differentiate in the amplitude of the further voltage (higher amplitude in FIG. 5A, longer vector) and in the polarity of the further voltage (vector going up in FIG. 5A, going down in FIG. 5B).

Figure 6:
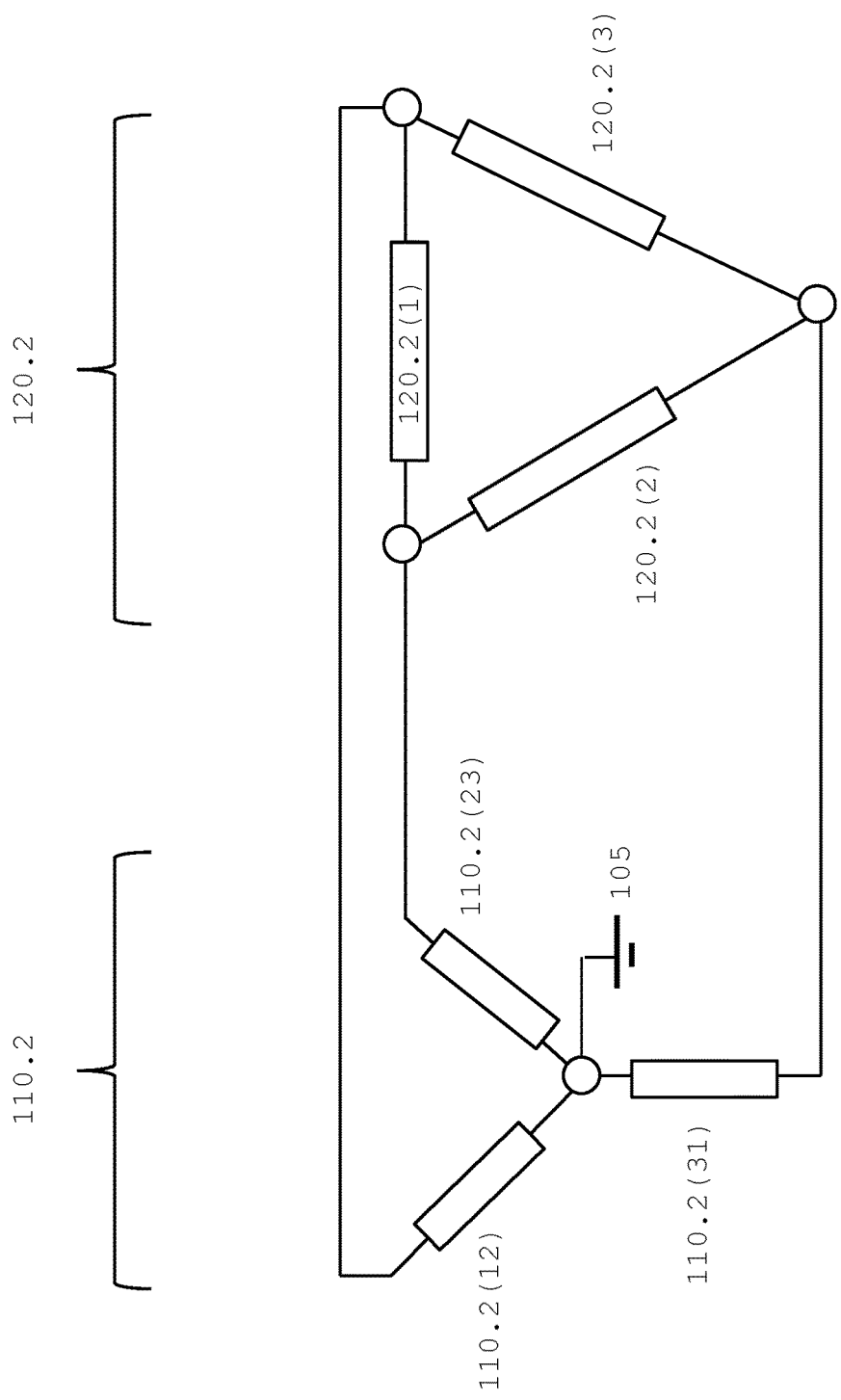
FIG. 6 illustrates the exemplary phase shifting transformer with more details regarding the secondary coils that belong to the of the exciting unit and of the secondary coils that belong to the series unit.

FIG. 6 illustrates the phase shifting transformer with more details regarding secondary coils 110.2 that belong to exciting unit 110 (cf. FIG. 3) and of secondary coils 120.2 that belong to series unit 120 (cf. FIG. 3). In other words, this relates to the intermediate circuit.

In exciter unit 110, secondary coils 110.2 (12), 110.2 (23) and 110.2 (31) are connected to ground 105 in a so-called star arrangement. In series unit 120, coils 120.2(1), 120.2(3), and 120.2(3) are connected in a so-called delta arrangement.

Figure 7:
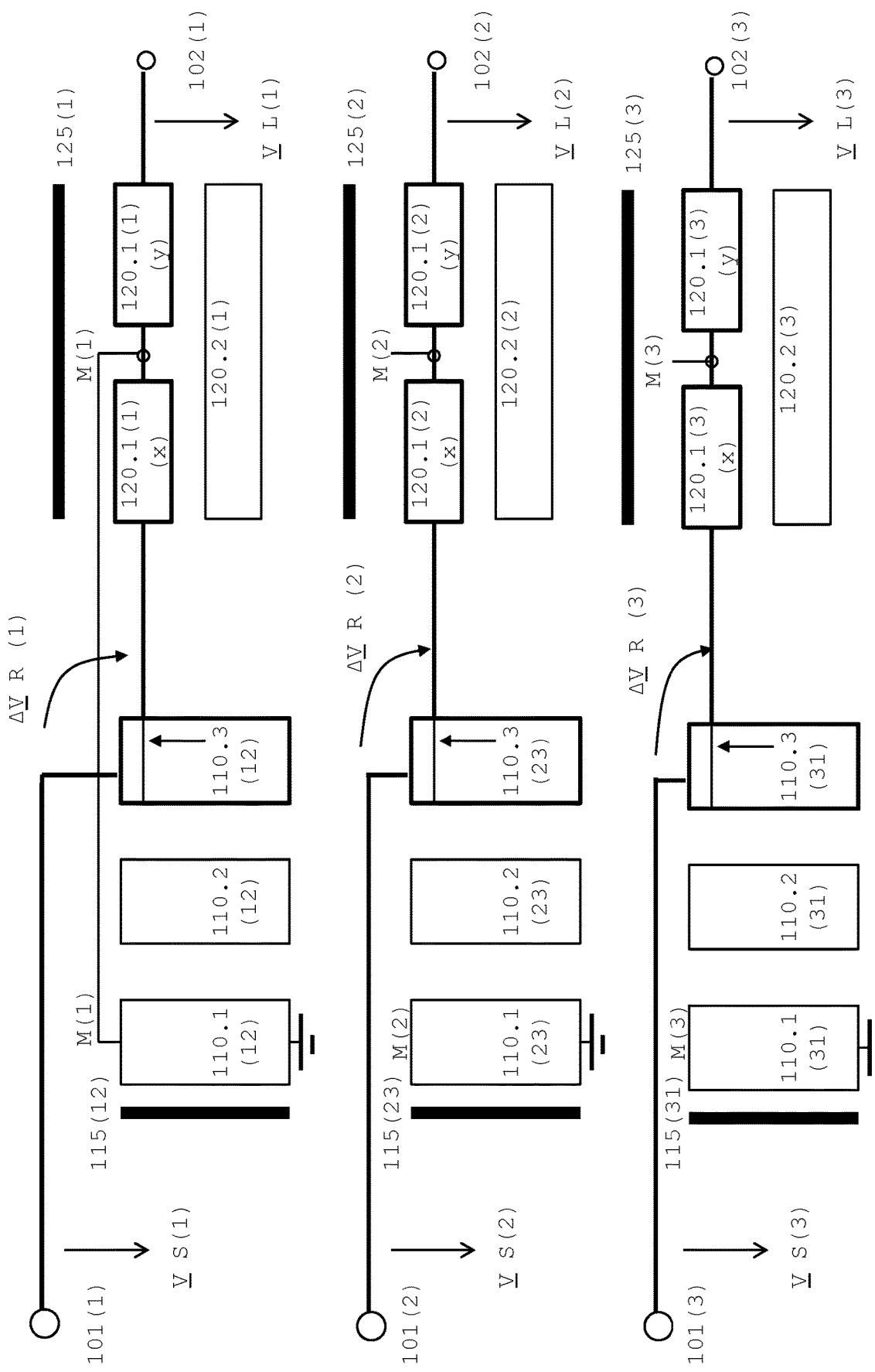
FIG. 7 illustrates the exemplary phase shifting transformer with more details regarding the primary coils of the exciting unit, the further coils of the executing unit and the primary coils of the series unit.

FIG. 7 illustrates phase shifting transformer 100 with more details regarding primary coils 110.1 of exciting unit 110 (cf. FIG. 3), further coils 110.3 of exciting unit 110 and primary coils 120.1 of series unit 120. FIG. 7 illustrates secondary coils 110.2(12), 110.2(23) and 110.2(31) of exciting unit 110 and secondary coils 120.2(1), 120.2(2) and 120.2(3) of series unit 120 but leaves out the connections that are already explained in connection with FIG. 6.

FIG. 7 illustrates lines (1), (2) and (3) separately, so that the source side terminals are referred to as terminal 101(1) with voltage V S(1), terminal 101(2) with voltage V S(2) and terminal 101(3) with voltage V S(3). The same principle applies for the load side terminals: terminal 102(1) with voltage V L(1), terminal 102(2) with voltage V L(2) and terminal 102(3) with voltage V L(3). As explained above, the voltages are defined (i.e. measured) against ground (cf. 105 in FIGS. 1B, 3).

Exciting unit 110 has three core-and-coil arrangements (or transformers) with cores 115(12), 115(23) and 115(31), respectively.

Series unit 120 has three core-and-coil arrangements (or transformers) with cores 125(1), 125(2) and 125(3), respectively. In the embodiment that is illustrated in FIG. 7, series unit 120 has the primary coils with connectors M(1), M(2) and M(3) that divide primary coils 120.1(1), 120.1(2) and 120.1(3) in first and second portions (indicated by (x) and (y)). The first and second portions can have substantially equal number of windings. In other words, the M-connectors divide the coils in the middle. This can be implemented by taps (i.e. by center taps).

The M-connectors are connected to the primary coils of the exciting unit: M(1) to coil 110.1(12), M(2) to coil 110.1(23), and M(3) to coil 110.1(31). The other ends of coils 110.1(12), coil 110.1(23), and coil 110.1(31) are connected to ground. For simplicity, the figures do not show all connections.

The further coils are connected in series between the source side terminals and the series unit. As illustrated, the further coils are variable coils. The regulator taps are connected to the series unit, but the taps could also be connected to the source side terminals. Reversing the connection would change the polarity of the further voltages ΔV R (1), ΔV R (2), and ΔV R (3). For simplicity, polarity switch 150 is not illustrated. The person of skill in the art knows that the polarity has to be changed for all further voltages at the same time.

More in detail: coil 110.3(12) is connected between terminal 101(1) and coil 120.1(1)(x), coil 110.3(23) is connected between terminal 101(2) and coil 120.1(2)(x), and coil 110.3(31) is connected between terminal 101(3) and coil 120.1(3)(x).

FIG. 8 illustrates phase shifting transformer 100 with an alternative arrangement of the coils and the cores. For simplicity, connection and terminals are not illustrated. Core 115 is the core for the exciting unit with primary coils 110.1(12), 110.1(23), 110.1(31), with secondary coils 110.2 (12), 110.2(23), 110.2(31), and with tertiary (further) coils 110.3(12), 110.3(23), 110.3(31). Core 125 is the core for the series unit with primary coils 120.1(1), 120.1(2), 120.1(3) (with (x) and (y) portions), and with secondary coils 120.2 (1), 120.2(2), 120.2(3).

The person of skill in the art can select suitable implementations for the cores and the coils. The cores can be of the so-called shell-type (with an iron surrounding the coils). The coils can be arranged on separate legs of the cores.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A phase shifting transformer for poly-phase alternating current (AC) with source side terminals and with load side terminals, the phase shifting transformer comprising:
    an exciting unit comprising a first transformer with primary coils connected between pairs of the source side terminals and with secondary coils to provide quadrature voltages; and
    a series unit comprising a second transformer with primary coils connected in series between the source side terminals and the load side terminals and with secondary coils to receive the quadrature voltages, thus providing a voltage phase displacement between the source side terminals and the load side terminals;
    wherein the exciting unit comprises further coils that are magnetically coupled to the primary coils and to the secondary coils of the exciting unit to provide further voltages, with the further coils connected in series between the source side terminals and the series unit, so that the voltages at the load terminals are combinations of the quadrature voltages and the further voltages with the source voltages, thus modifying the voltage phase displacement between the source side terminals and the load side terminals.

2. The phase shifting transformer according to claim 1, wherein in the exciting unit, the further coils are magnetically coupled to the primary coils and to the secondary coils by being mounted on a common core.

3. The phase shifting transformer according to claim 2, wherein in the exciting unit, the number of windings of further coils is less than the number of windings in the primary coils of the exciting unit.

4. The phase shifting transformer according to claim 3, wherein the further coils have adjustable inductance so that the amplitude of the further voltages is adjustable.

5. The phase shifting transformer according to claim 4, wherein the inductance of the further coils is adjustable by regulator taps that modify the number of windings that are used to provide the further voltages.

6. The phase shifting transformer according to claim 5, further comprising a polarity switch that is adapted to alter the polarity of the further coils so that the polarity of the further voltages can be altered.

7. The phase shifting transformer according to claim 1, wherein in the exciting unit, the number of windings of further coils is less than the number of windings in the primary coils of the exciting unit.

8. The phase shifting transformer according to claim 1, wherein the further coils have adjustable inductance so that the amplitude of the further voltages is adjustable.

9. The phase shifting transformer according to claim 1, wherein the inductance of the further coils is adjustable by regulator taps that modify the number of windings that are used to provide the further voltages.

10. The phase shifting transformer according to claim 1, further comprising a polarity switch that is adapted to alter the polarity of the further coils so that the polarity of the further voltages can be altered.

* * * * *